US011882312B2

(12) United States Patent
Wenger et al.

(10) Patent No.: US 11,882,312 B2
(45) Date of Patent: *Jan. 23, 2024

(54) NETWORK ABSTRACTION LAYER UNIT HEADER

(71) Applicant: TENCENT AMERICA LLC, Palo Alto, CA (US)

(72) Inventors: Stephan Wenger, Hillsborough, CA (US); Byeongdoo Choi, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,776

(22) Filed: Jun. 10, 2022

(65) Prior Publication Data

US 2022/0312044 A1 Sep. 29, 2022

Related U.S. Application Data

(63) Continuation of application No. 16/459,883, filed on Jul. 2, 2019, now Pat. No. 11,395,006.

(60) Provisional application No. 62/814,661, filed on Mar. 6, 2019.

(51) Int. Cl.
*H04N 19/70* (2014.01)
*H04N 19/169* (2014.01)

(52) U.S. Cl.
CPC ........... *H04N 19/70* (2014.11); *H04N 19/188* (2014.11)

(58) Field of Classification Search
None
See application file for complete search history.

(56) References Cited

U.S. PATENT DOCUMENTS

| 9,686,542 | B2* | 6/2017 | Wang | H04N 21/23605 |
|---|---|---|---|---|
| 10,666,978 | B2* | 5/2020 | Tsukuba | H04N 19/17 |
| 2013/0064284 | A1* | 3/2013 | Samuelsson | H04N 19/187 |
| | | | | 375/E7.026 |

(Continued)

FOREIGN PATENT DOCUMENTS

WO WO-2011035211 A2 * 3/2011 ........... H04N 19/174

OTHER PUBLICATIONS

Written Opinion dated Apr. 21, 2020, issued by the International Searching Authority in application No. PCT/US2020/020955.

(Continued)

*Primary Examiner* — Chikaodili E Anyikire
(74) *Attorney, Agent, or Firm* — Crowell & Moring LLP

(57) ABSTRACT

An approach for reconstructing a Network Abstraction Layer (NAL) unit for video decoding using at least one processor includes decoding a first syntax element included in a NAL unit header; determining, based on the first syntax element, a NAL unit class including a plurality of NAL unit types; decoding a second syntax element included in the NAL unit header; and based on the NAL unit class being a first NAL unit class, determining a NAL unit type from among the NAL unit types using a combination of the NAL unit class and the second syntax element, and reconstructing the NAL unit based on the determined NAL unit type; and based on the NAL unit class being a second NAL unit class, determining a temporal identifier (TID) based on the second syntax element, and reconstructing the NAL unit based on the determined TID.

20 Claims, 8 Drawing Sheets

(56) References Cited

U.S. PATENT DOCUMENTS

| | | | | |
|---|---|---|---|---|
| 2013/0182755 A1* | 7/2013 | Chen | ...................... | H04N 19/70 |
| | | | | 375/240.01 |
| 2014/0092995 A1* | 4/2014 | Deshpande | ............ | H04N 19/46 |
| | | | | 375/240.26 |
| 2016/0373771 A1* | 12/2016 | Hendry | .................. | H04N 19/70 |
| 2021/0168360 A1* | 6/2021 | Hendry | ................ | H04N 19/176 |

OTHER PUBLICATIONS

International Search Report dated Apr. 21, 2020, issued by the International Searching Authority in application No. PCT/US2020/020955.
Jill Boyce et al., "NAL unit header and parameter set designs for HEVC extensions", Joint Collaborative on 3D Video Coding Extension Development of ITU-T SG 16 WP 3 and ISO/IEC JTC 1/SC 29/WG 11, JCT3V-B1007, 2nd Meeting: Shanghai, CN, Oct. 13-10, 2012.
Benjamin Bross et al., "Versatile Video Coding (Draft 4)", JVET of ITU-T SG 16 WP 3 and ISO/IEC JTC 1/SC 29/WG 11, JVET-M1001-vS4, 13th Meeting: Marrakech, MA, Jan. 9-18, 2019.
Stephan Wenger et al., "AHG17: On NAL unit header design for VVC", JVET of ITU-T SG 16 WP 3 and ISO/IEC JTC 1/SC 29 WG 11, JVET-M0520, 13th Meeting: Marrakech, MA Jan. 9-18, 2019.
Supplementary European Search Report dated Nov. 3, 2021 in Application No. 20765663.8.
Extended European Search Report dated Oct. 13, 2021 in Application No. 20765663.8.

* cited by examiner

| | C | Descriptor |
|---|---|---|
| nal_unit( NumBytesInNALunit ) { | | |
|   forbidden_zero_bit | All | f(1) |
|   nal_ref_idc | All | u(2) |
|   nal_unit_type | All | u(5) |
|   NumBytesInRBSP = 0 | | |
|   nalUnitHeaderBytes = 1 | | |
|   if( nal_unit_type == 14 \|\| nal_unit_type == 20 ) { | | |
|     nal_unit_type ( = 21 ) { | | |
|     if( nal_unit_type != 21 ) | | |
|     svc_extension_flag | All | u(1) |
|     else | | |
|     avc_3d_extension_flag | All | u(1) |
|     if( svc_extension_flag ) { | | |
|     nal_unit_header_svc_extension( ) /* specified in Annex G */ | All | |
|     nalUnitHeaderBytes += 3 | | |

| | Descriptor |
|---|---|
| nal_unit_header( ) { | |
|   forbidden_zero_bit | f(1) |
|   nal_unit_type | u(6) |
|   nuh_layer_3d | u(6) |
|   nuh_temporal_id_plus1 | u(3) |
| } | |

FIG. 1

101 → forbidden_zero_bit  
102 → nal_ref_idc  
103 → nal_unit_type  
104 → nal_unit_header  
105 → forbidden_zero_bit  
106 → nuh_layer_3d  
107 → nuh_temporal_id_plus1

FIG. 5    Encoder 303

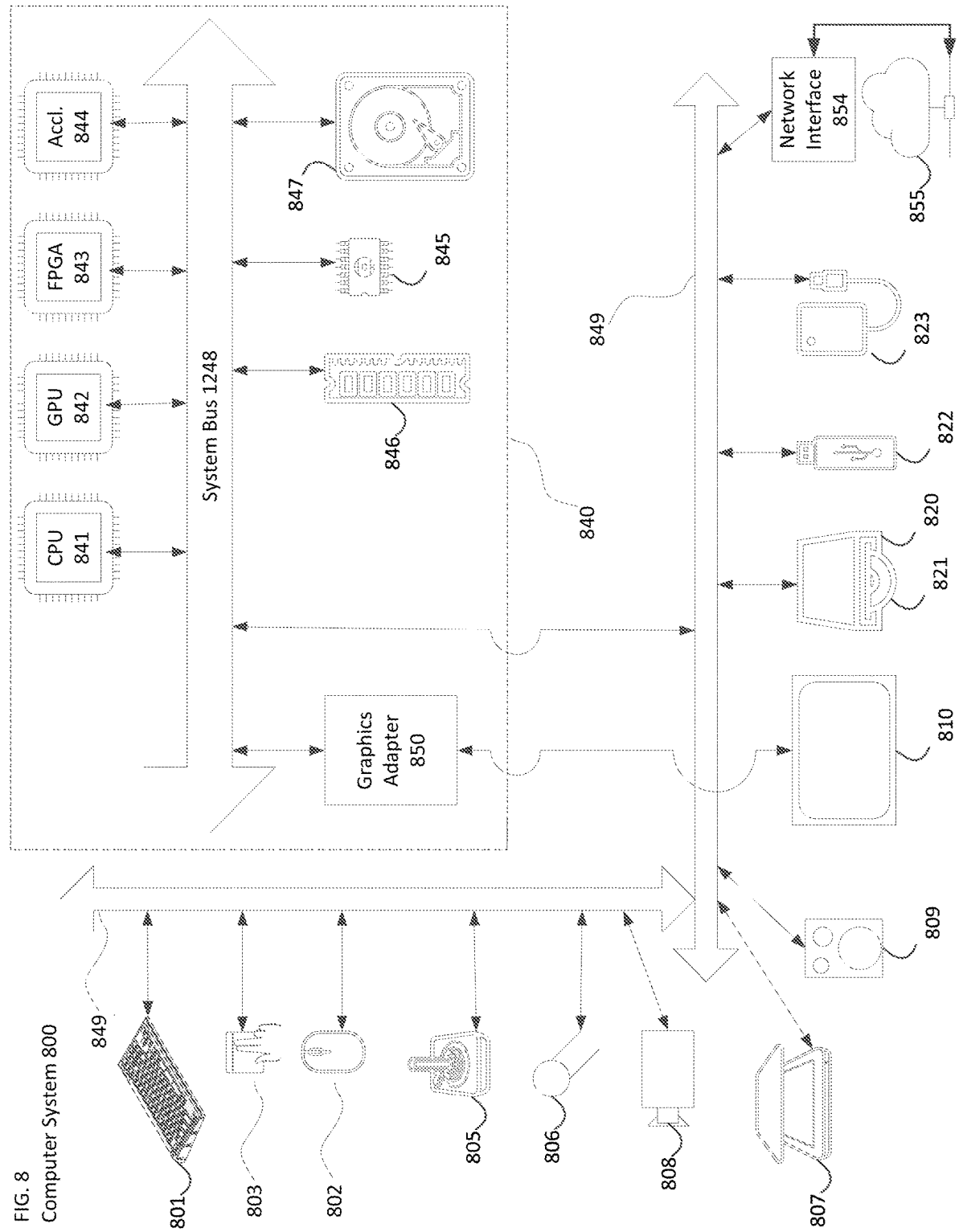

NETWORK ABSTRACTION LAYER UNIT HEADER

CROSS-REFERENCE TO RELATED APPLICATION

This is a continuation of U.S. application Ser. No. 16/459,883 filed Jul. 2, 2019, claims priority from 35 U.S.C. § 119 to U.S. Provisional Application No. 62/814,661, filed on Mar. 6, 2019, in the United States Patent & Trademark Office, the disclosure of which is incorporated herein by reference in its entirety.

FIELD

The disclosed subject matter relates to video coding and decoding, and more specifically, to the coding of the Network Abstraction (NAL-) Unit header where certain bits are used for temporal ID for those NAL units that have temporal layer properties, and for other purposes for those NAL units which do not have temporal layer properties.

BACKGROUND

Examples of video coding and decoding using inter-picture prediction with motion compensation have been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

An example of a Network Abstraction Layer was introduced in ITU-T Rec. H.264. A coded video bitstream can be divided into individual units, called Network Abstraction Layer (NAL-) Units. Each NAL unit can have a header that can be interpreted without adherence to start code emulation prevention (that may otherwise need to be adhered to, potentially at substantial implementation and computational cost, in other parts of the NAL unit.) The NAL unit header in H.264 (101), was designed such that it included only fixed length codewords, as shown in FIG. 1. For certain values of nal_unit_type (102), certain extensions to the NAL unit header (103) were available by adding a second and sometimes third octet, each of which also contained fixed length codewords. A Media Aware Network Element (MANE), MCU, file rewriter, etc., could make use of these fixed length codewords to effectively tailor a bitstream, without full transcoding and without being constrained by start code emulation prevention.

In H.265, a somewhat simplified design was chosen. The H.265 NAL unit header (104) was fixed length at two octets, and included a NAL unit type (105), spatio/SNR layer ID (106) and temporal layer ID (107). No extension mechanism was present. Compared to the H.264 design, this design had a certain coding efficiency penalty as the header was always 2 octets in length, compared to the variable length, but often 1 octet length of the H.264 design. On the other hand, the support of scalable and Multiview extensions was greatly simplified, allowing for a certain backward compatibility between scalable/Multiview and non-scalable/Multiview legacy encoding.

SUMMARY

In an embodiment, there is provided a method of reconstructing a Network Abstraction Layer (NAL) unit for video decoding using at least one processor, the method including decoding a first syntax element included in a NAL unit header; determining, based on the first syntax element, a NAL unit class including a plurality of NAL unit types; decoding a second syntax element included in the NAL unit header; and based on the NAL unit class being a first NAL unit class, determining a NAL unit type from among the NAL unit types using a combination of the NAL unit class and the second syntax element, and reconstructing the NAL unit based on the determined NAL unit type; and based on the NAL unit class being a second NAL unit class, determining a temporal identifier (TID) based on the second syntax element, and reconstructing the NAL unit based on the determined TID.

In an embodiment, there is provided a device for reconstructing a Network Abstraction Layer (NAL) unit for video decoding, the device including at least one memory configured to store program code; and at least one processor configured to read the program code and operate as instructed by the program code, the program code including first decoding code configured to cause the at least one processor to decode a first syntax element included in a NAL unit header; first determining code configured to cause the at least one processor to, based on the first syntax element, determine a NAL unit class including a plurality of NAL unit types; second decoding code configured to cause the at least one processor to decode a second syntax element included in the NAL unit header; and second determining code configured to cause the at least one processor to, based on the NAL unit class being a first NAL unit class, determine a NAL unit type from among the NAL unit types using a combination of the NAL unit class and the second syntax element, and reconstruct the NAL unit based on the determined NAL unit type; and third determining code configured to cause the at least one processor to, based on the NAL unit class being a second NAL unit class, determine a temporal identifier (TID) based on the second syntax element, and reconstruct the NAL unit based on the determined TID.

In an embodiment, there is provided a non-transitory computer-readable medium storing instructions, the instructions including: one or more instructions that, when executed by one or more processors of a device for reconstructing a Network Abstraction Layer (NAL) unit for video decoding, cause the one or more processors to decode a first syntax element included in a NAL unit header; determine, based on the first syntax element, a NAL unit class including a plurality of NAL unit types; decode a second syntax element included in the NAL unit header; and based on the NAL unit class being a first NAL unit class, determine a NAL unit type from among the NAL unit types using a combination of the NAL unit class and the second syntax element, and reconstruct the NAL unit based on the determined NAL unit type; and based on the NAL unit class being a second NAL unit class, determine a temporal identifier (TID) based on the second syntax element, and reconstruct the NAL unit based on the determined TID.

BRIEF DESCRIPTION OF THE DRAWINGS

Further features, the nature, and various advantages of the disclosed subject matter will be more apparent from the following detailed description and the accompanying drawings in which:

FIG. 1 is a schematic illustration of NAL Unit Headers in accordance with H.264 and H.265

FIG. 8 is a schematic illustration of a computer system in accordance with an embodiment.

DETAILED DESCRIPTION

The present disclosure relates to video coding and decoding, and more specifically, to the coding of the Network Abstraction (NAL-) Unit header where certain bits are used for temporal ID for those NAL units that have temporal layer properties, and for other purposes for those NAL units which do not have temporal layer properties.

The H.264 NAL unit header is in many cases compact, but insufficient for certain applications including temporal scalability, which may be in practical use for certain applications. The H.265 NAL unit header effectively supports temporal scalability, but requires a minimum of 16 bits, and has very few—if any—unallocated codepoints for future extensions. On the other hand, there are certain combinations of values in the H.265 NAL unit header syntax elements that are implicitly disallowed, leading to unnecessary low entropy. For example, certain parameter sets such as the sequence parameter set, by definition, apply to a whole coded video sequence that is composed of NAL unit belonging to all temporal layers; yet, an H.265 NAL unit header for a sequence parameter set wastes three bits for a temporal ID field that must be zero in any compliant bitstream. Re-using these bits can increase coding efficiency.

Figure 2:
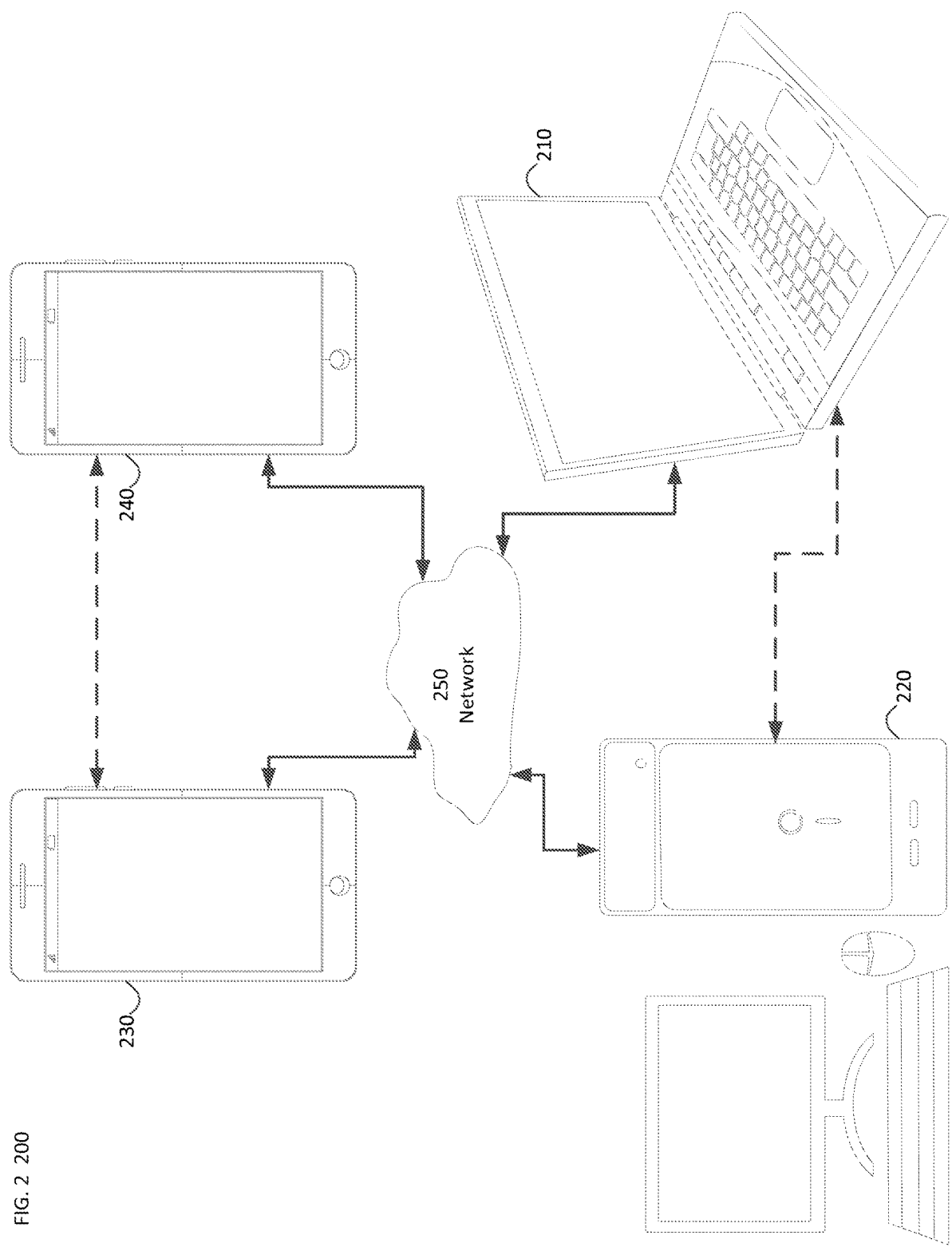
FIG. 2 is a schematic illustration of a simplified block diagram of a communication system in accordance with an embodiment.

FIG. 2 illustrates a simplified block diagram of a communication system (200) according to an embodiment of the present disclosure. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
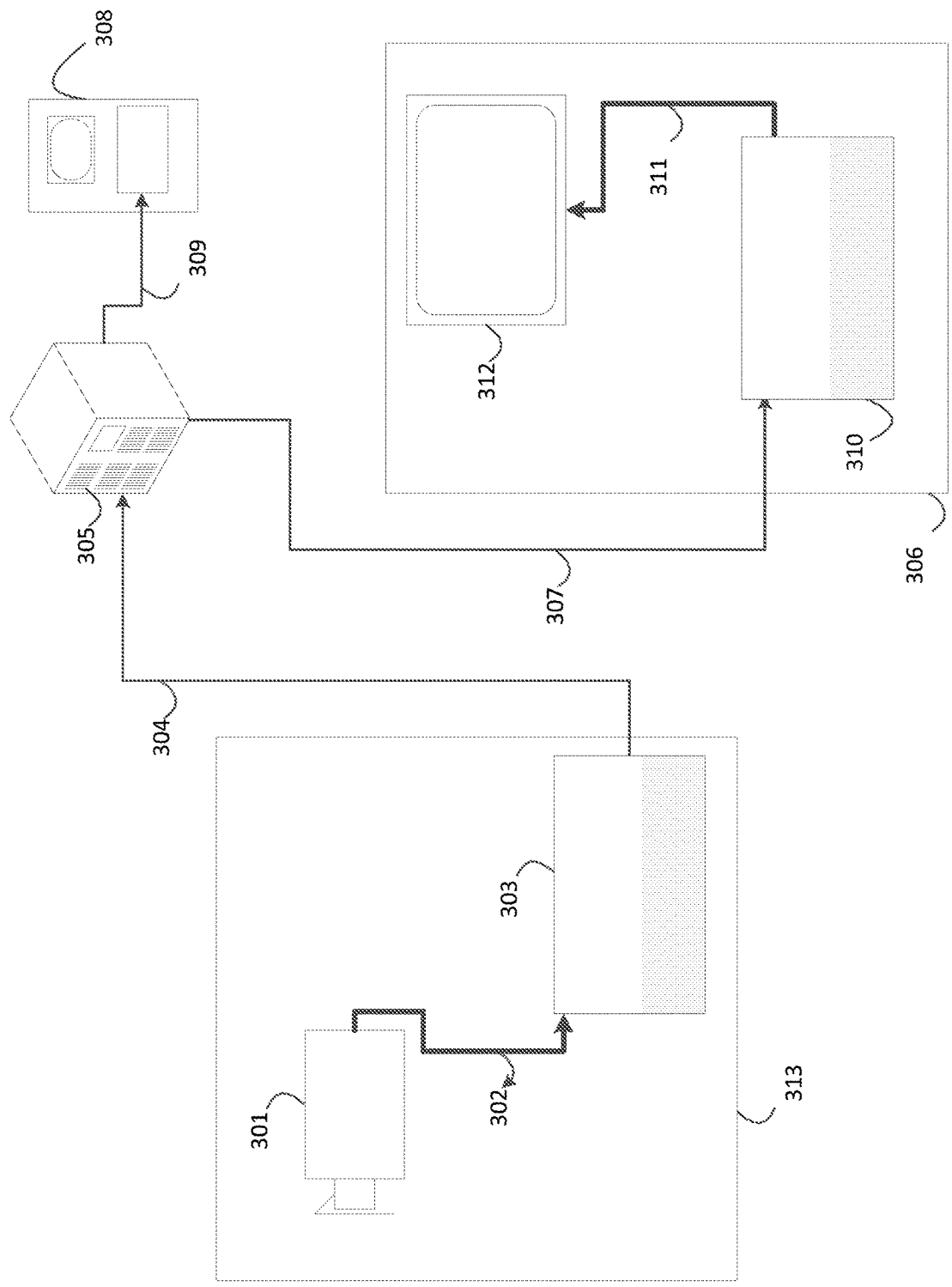
FIG. 3 is a schematic illustration of a simplified block diagram of a communication system in accordance with an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 4:
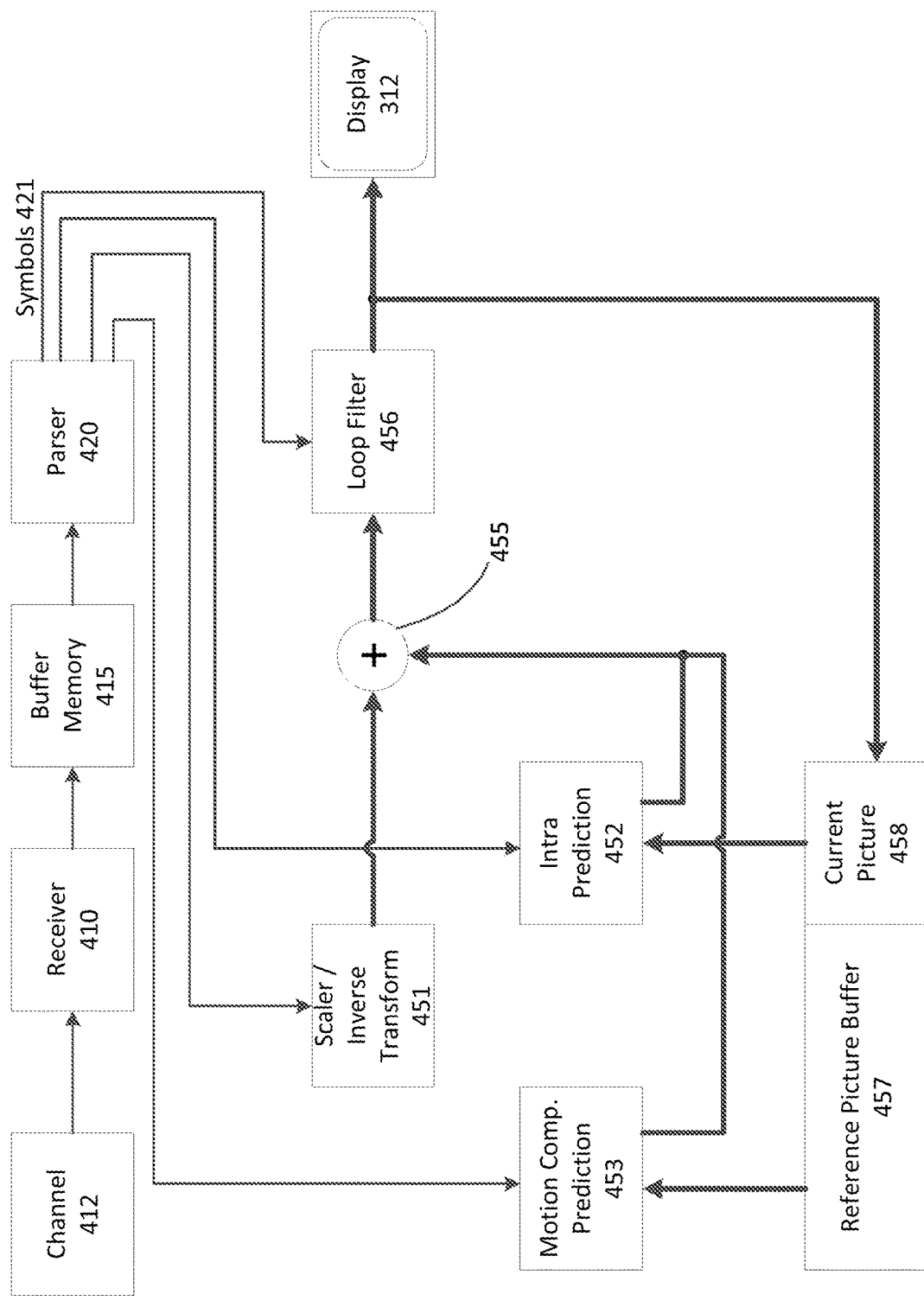
FIG. 4 is a schematic illustration of a simplified block diagram of a decoder in accordance with an embodiment.

FIG. 4 may be a functional block diagram of a video decoder (310) according to an embodiment of the present disclosure.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include an parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (420) may perform entropy decoding/parsing operation on the video sequence received from the buffer (415), so to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder 310 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (458). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler / inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when subsample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder 420 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (420) to properly decode the data and/or to more accurately reconstruct the original video data. Additional data can be in the form of, for example, temporal, spatial, or SNR enhancement layers, redundant slices, redundant pictures, forward error correction codes, and so on.

Figure 5:
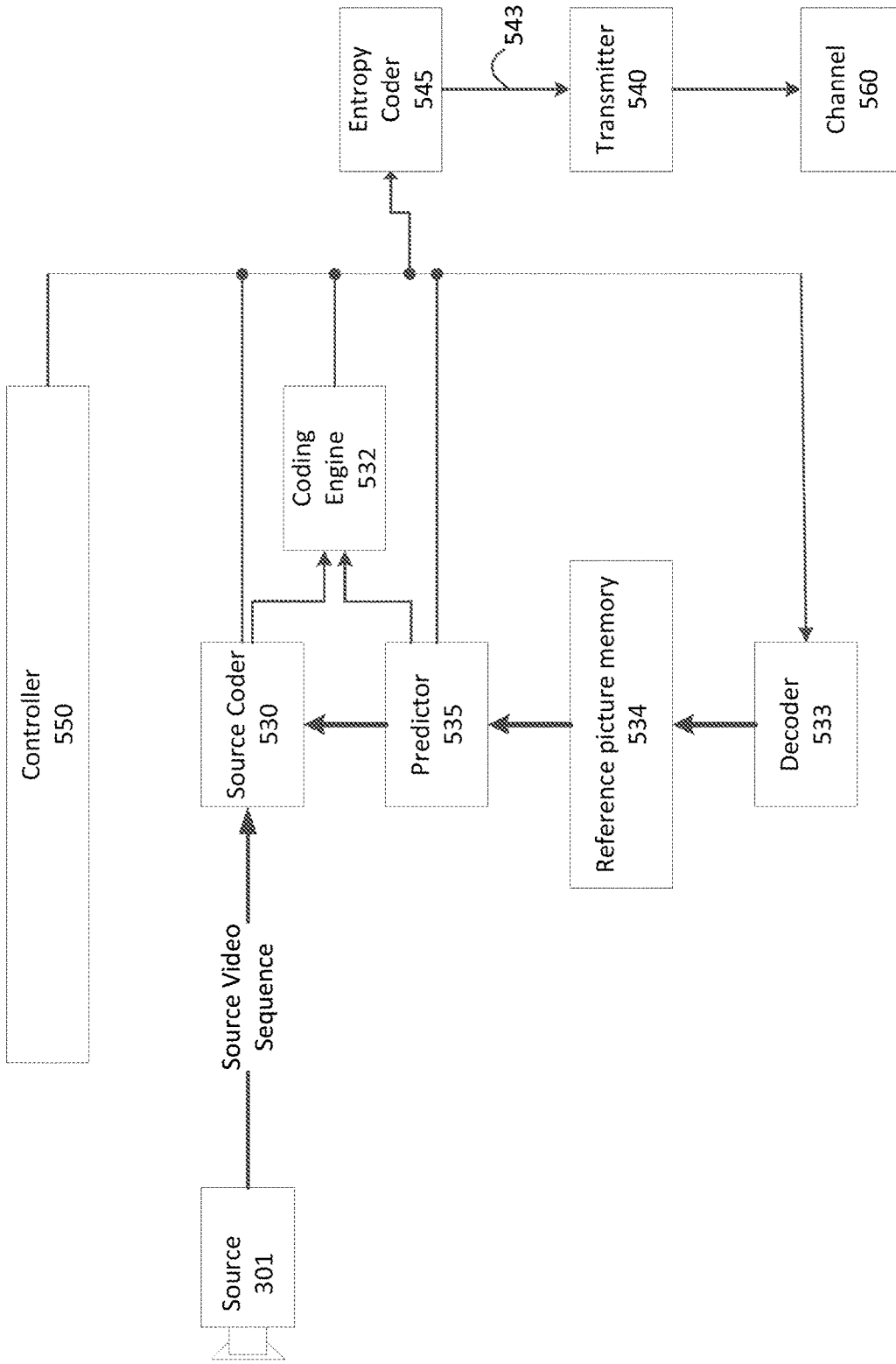
FIG. 5 is a schematic illustration of a simplified block diagram of an encoder in accordance with an embodiment.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the are readily recognizes as a "coding loop". As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding , variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by- block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In the following, a focus of the description will be on the high level syntax of video codecs, and specifically on the NAL unit header (NUH) design.

As NUHs may be interpreted not only by decoders, which can be expected to handle complex syntax, but also by MANEs, file rewriters, and so on (MANEs henceforth), its design may have to avoid complex entropy coding schemes such as variable length codes (VLC) or arithmetic coding. On the other hand, a certain amount of complexity, including conditional presence or conditional interpretation of syntax elements may be acceptable, especially if the information conveyed in those syntax elements would otherwise need to be moved outside of the NUH and into the NAL unit payload, or if the NUH would otherwise need to be unnecessarily large.

For various reasons including easy processing by MANEs, NUHs have been octet aligned—which implies that their length in bits is divisible by 8—otherwise, unnecessary and expensive (in terms of rate-distortion performance as well as computational complexity) padding may be required. As at least one bit (called forbidden_zero_bit in both H.264 and H.265 NUHs) may, as a minimum, be required, for reason of start code emulation prevention when video is being transported over an MPEG-2 Transport Stream channel. Under this assumption, the theoretical minimum length of a NAL unit header is 8 bits. A design should stay within these 8 bits for the most common NAL unit types (NUTs), but may require more bits for more exotic and less frequent NUTs or for NUTs where the header overhead, as a percentage of the coded picture type, is negligible, such as, for example I pictures and their derivates, or pictures coded in essentially uncompressed form. Insofar, minimizing the number of bits required in the fields of the NAL unit header may be important. If the length of an individual field can be shortened, that can be advantageous. A field of shortened length, however, implies a smaller number of available codepoints representable by field.

During the development of H.265, a large number of additional NUTs, relative to those in H.264, were identified. Further, in H.265, temporal scalability signaling in the NAL unit header was introduced in the baseline profiles, called Main profile in H.265, and may be in common use today. For future video coding standards, such as VVC, it can be anticipated that neither the number of NUTs, nor the need for temporal scalability will go away. Using six bits for the NUT, one bit for the forbidden_zero_bit, and three bits for the temporal layering information, one arrives at 10 bits which, due to octet alignment, results in a 16 bit NUH in H.265. Similar arithmetic applies to the VVC working draft at the time of writing.

Still, it would be desirable from a coding efficiency viewpoint that at least for the most common NUTs, such as trailing pictures, which may include P pictures/slices/tile groups, B pictures/slices/tile groups, and so forth, to use a NUH of only a single octet, while preserving the option of temporal scalability signaling. Assuming three bits required for the temporal ID, and one bit for the forbidden_zero_bit, that would result in only four bits available for the NUT field, resulting in a total of 16 possible NUTs. Neither H.265, nor future video coding standards such as, for example VVC, are likely to use 16 or less NUTs.

Embodiments of the disclosed subject matter implement this desire through the conditional use of the bits reserved for temporal ID as an additional demultiplex point for NUTs, for those NAL unit types which, by design, may apply to all temporal layers, or which are conceptually independent of temporal layering.

Certain NAL unit types may be independent from temporal layering. In many cases, related art such as H.265, for these NAL units, makes it a requirement for bitstream compliance that the temporal ID is set to zero. In other cases, related are such as H.265 instructs decoders to ignore the value of temporal ID, or is silent about the values allowed in this field, which may have the same effect.

Examples for those temporal-ID agnostic NAL unit types include:

(1) As a perhaps overly broad characterization, many NAL NUTs may not have temporal layer properties. In contrast, many VCL NUTs may have temporal layer properties.

(2) Certain parameter sets including, for example, decoder parameter set, video parameter set, and sequence parameter set may have, as their scope, at least a coded video sequence (CVS). A CVS, by definition, can include NAL units belonging to multiple temporal layers. Therefore, such parameter sets may be temporal-ID agnostic.

(3) "Lower" parameter sets such as, for example, the picture parameter set, slice parameter set, adaptation parameter set, header parameter set, and so on, may have a scope of a single coded picture or parts thereof. A given coded picture may have a defined temporal layer. Insofar, in some cases, it can be sensible to use the temporal ID in the parameter set NAL unit of these parameter set to distinguish between parameter sets of the same type and parameter set ID, but different temporal layers. For example, it can be sensible to have multiple picture parameter sets with a picture parameter set ID of 0, that cover the multiple temporal layers in use. The reason why such a design choice may be sensible can be that the coding of the parameter set ID is, in some cases, a variable length coded field in the slice/tile/tile group header (with a descriptor of ue(v) when documented in accordance with the conventions established in H.265). A ue(v) syntax element grows quickly in size when values become larger, whereas the temporal ID field in the NAL unit header is fixed to three bits. Also, in a given bitstream there can be many more NAL units that include slice/tile/tile group headers comprising the ue(v) coded parameter set ID than there are parameter set NAL units in the same bitstream.

On the other hand, an extension of the NAL unit header from 8 to 16 bit may be required if not using the temporal ID field for such "lower" parameter sets as a demultiplex point, and that may well be considerably costlier than slightly longer ue(v) coded parameter set ID syntax elements. Insofar, even for "lower" parameter sets, it may make sense to use the temporal ID as a demux point, and rely on a larger numbering space of the parameter set ID for representing multiple parameter sets of a "lower" type associated with temporal layers. The VVC draft at the time of writing recognizes that and does not use the temporal ID field for picture parameter sets or adaptation parameter sets. As a result, those parameter set types can also be demultiplexed by the bits used for the temporal ID field.

(4) Certain NAL unit types may be reserved for certain classes of SEI messages and other non-normative data such as, for example, filler data, picture delimiter, and so forth, as well as certain markers such as end-of-stream markers. To the extent that those NAL units do not observe the temporal ID, all these NAL units may share a single NAL unit type, and be distinguished by the value of the temporal ID.

Figure 6:
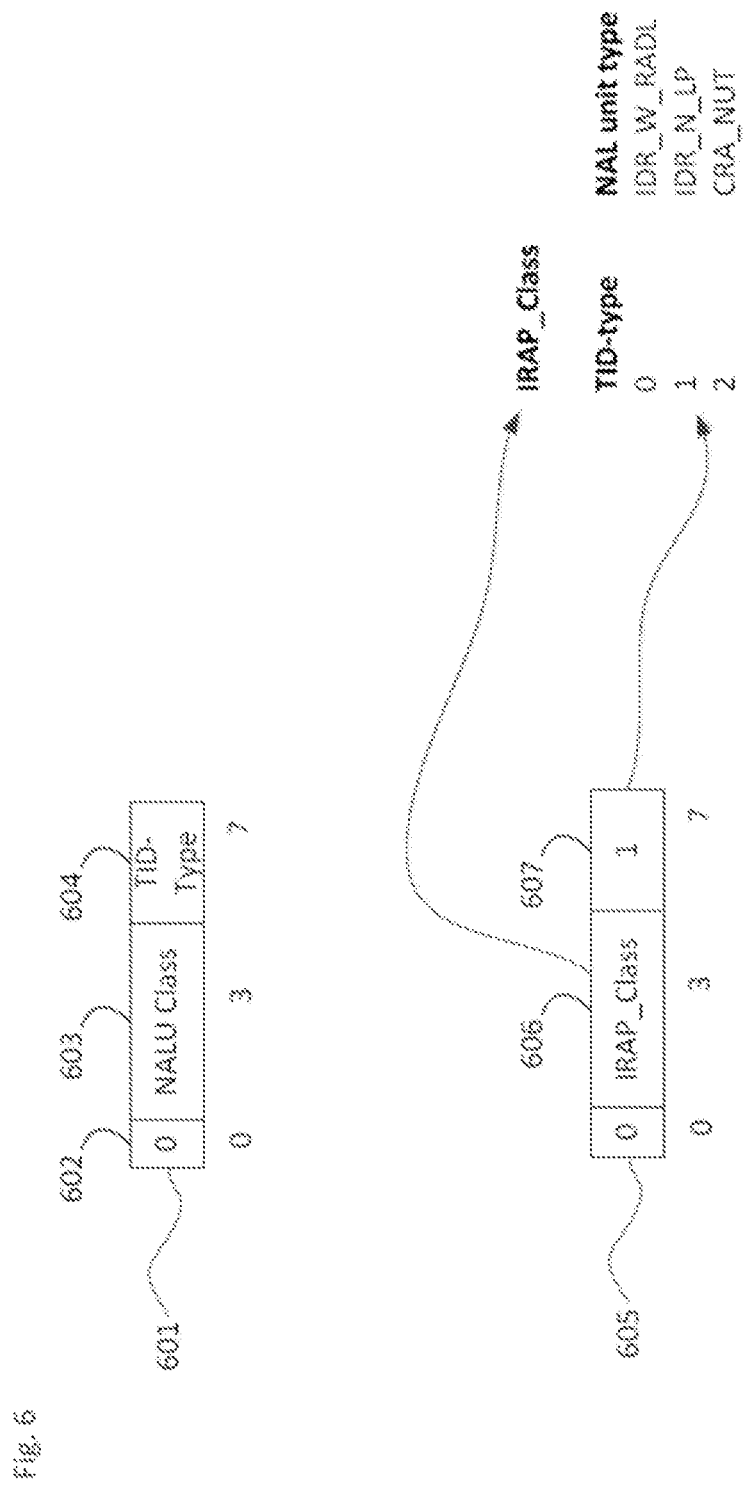
FIG. 6 is a schematic illustration of a NAL Unit Headers using a NAL Unit Type Class, in accordance with an embodiment.

FIG. 6 illustrates an example of a NUH (601) according to an embodiment which is similar in size to the one of H.264, namely 8 bits. The example NUH (601) includes a forbidden_zero_bit (602), NALU class syntax element of four bits (603), and a TID-type syntax element (604) of three bits. The TID-type syntax element can in accordance with an embodiment be re-used, for certain NALU classes, as an additional demultiplex point to distinguish NAL unit types in that class. For example, as described in more detail below, when in an exemplary NUH (605) the NAL Class is set to IRAP class (606), that can trigger the use of the value of the TID-type bit (here: 1, identifying IDR-N-LP NAL unit) (607) to identify the NAL unit type as IDR_N_LP.

Versatile Video Coding (VVC) will be published also as ITU-T Rec. H.266. Referring to a working draft, namely VVC Draft 4 version 5, as JVET-M1001-v5, it is observed that the VVC NAL Unit header occupies 16 bits; see JVET-M1001-v5 page 27. Specifically, the VVC NUH uses one bit as forbidden zero bit, five bits for the nal unit type, three bits for temporal ID, and reserves 7 bits.

Table 1 and Table 2 below may correspond to JVET-M1001-v5 table 7-1:

TABLE 1

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp( ) | VCL |
| 1 | STSA_NUT | Coded tile group of an STSA picture tile_group_layer_rbsp( ) | VCL |
| 2 | RASL_NUT | Coded tile group of a RASL picture tile_group_layer_rbsp( ) | VCL |
| 3 | RADL_NUT | Coded tile group of a RADL picture tile_group_layer_rbsp( ) | VCL |
| 4 . . . 7 | RSV_VCL_4 . . . RSV_VCL_7 | Reserved non-IRAP VCL NAL unit types | VCL |
| 8 | IDR_W_RADL | Coded tile group of an IDR picture tile_group_layer_rbsp( ) | VCL |
| 9 | IDR_N_LP | | |
| 10 | CRA_NUT | Coded tile group of a CRA picture tile_group_layer_rbsp( ) | VCL |
| 11 | RSV_IRAP_VCL11 | Reserved IRAP VCL NAL unit types | VCL |
| 12 | RSV_IRAP_VCL12 | | |
| 13 | RSV_IRAP_VCL13 | | |
| 14 . . . 15 | RSV_VCL14 . . . RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 . . . 27 | RSV_NVCL24 . . . RSV_NVCL27 | Reserved non-VCL NAL unit types | non-VCL |
| 28 . . . 31 | UNSPEC28 . . . UNSPEC31 | Unspecified non-VCL NAL unit types | non-VCL |

TABLE 2

| NALU Class | NALU Class | TID-type | Name of nal_unit_type | Content of NAL unit and RBSP syntax structure | NAL unit type class |
|---|---|---|---|---|---|
| 0 | TRAIL_Class | | TRAIL_NUT | Coded tile group of a non-STSA trailing picture tile_group_layer_rbsp( ) | VCL |
| 1 | STSA_Class | | STSA_NUT | Coded tile group of an STSA picture tile_group_layer_rbsp( ) | VCL |
| 2 | RASL_Class | | RASL_NUT | Coded tile group of a RASL picture tile_group_layer_rbsp( ) | VCL |
| 3 | RADL_Class | | RADL_NUT | Coded tile group of a RADL picture tile_group_layer_rbsp( ) | VCL |
| 4 | IRAP_Class | 0 | IDR_W_RADL | Coded tile group of an IDR picture tile_group_layer_rbsp( ) Coded tile group of a CRA picture tile_group_layer_rbsp( ) | VCL |
| | | 1 | IDR_N_LP | | |
| | | 2 | CRA_NUT | | |
| 5 | PARSET_Class | 0 | SPS_NUT | Sequence parameter set seq_parameter_set_rbsp( ) Picture parameter set pic_parameter_set_rbsp( ) Adaptation parameter set adaptation_parameter_set_rbsp( ) | non-VCL |
| | | 1 | PPS_NUT | | |
| | | 2 | APS_NUT | | |

TABLE 2-continued

| NALU Class | NALU Class | TID-type | Name of nal_unit_type | Content of NAL unit and RBSP syntax structure | NAL unit type class |
|---|---|---|---|---|---|
| 6 | MARKER_Class | 0<br>1<br>2 | AUD_NUT<br>EOS_NUT<br>EOB_NUT | Access unit delimiter access_unit_delimiter_rbsp( ) End of sequence end_of_seq_rbsp( ) End of bitstream end_of_bitstream_rbsp( ) | non-VCL |
| 7 | SEI_Class | 0<br>1 | PREFIX_SEI_NUT<br>SUFFIX_SEI_NUT | Supplemental enhancement information sei_rbsp( ) | non-VCL |
| 9 . . . 15 | Reserved/Unspecified | | | | non-VCL |

However, the full functionality of this 16 bit header, ignoring the unspecified/reserved bits/codepoints and the implied extensibility, may be implemented in accordance with the present disclosure matter using an 8 bit NUH in the same or another embodiment as follows:

As shown, only 8 classes are required to implement the full functionality—though not necessarily the full flexibility with respect to future extensions—of the NAL unit types currently defined in VVC, using an 8 bit NUH.

In the same or another embodiment, other allocations are equally possible. For example, one could sensibly combine what is listed above as "MARKER_Class" and "SEI_Class" into a single class, for example as follows in Table 3:

TABLE 3

| . . . | . . . | . . . | | | . . . |
|---|---|---|---|---|---|
| 5 | PARSET_Class | 0<br>1<br>2 | SPS_NUT<br>PPS_NUT<br>APS_NUT | Sequence parameter set seq_parameter_set_rbsp( ) Picture parameter set pic_parameter_set_rbsp( ) Adaptation parameter set adaptation_parameter_set_rbsp( ) | non-VCL |
| 6 | MAR_SEI_Class | 0<br>1<br>2<br>3<br>4 | AUD_NUT<br>EOS_NUT<br>EOB_NUT<br>PREFIX_SEI_NUT<br>SUFFIX_SEI_NUT | Access unit delimiter access_unit_delimiter_rbsp( ) End of sequence end_of_seq_rbsp( ) End of bitstream end_of_bitstream_rbsp( ) Supplemental enhancement information sei_rbsp( ) | non-VCL |
| 8 . . . 15 | Reserved/Unspecified | | | | non-VCL |

In the example of Table 3, only 7 of the available 16 codepoints enabled through the 4 bit NAL unit class field would be in use.

In certain cases, in the same or another embodiment, the "forbidden_zero_bit" may be used as an additional demultiplexing point. The "forbidden_zero_bit" was historically included in the NAL unit header to prevent start code emulation in certain limited environments, mainly when a bitstream is transported over MPEG-2 systems. Conceivably, there may be VVC technologies and bitstreams for which a standards setting organization does not envision that they ever need to be transported over MPEG-2 systems. NAL units related to these technologies may be using the forbidden_zero_bit, set to 1, as a demultiplexing point.

When the forbidden_zero_bit is set to one for start code emulation prevention, it may be understtod that 128 of the 256 possible values of the eight bits in the NAL unit header can be used to indicate information such as NAL unit types, temporal IDs, and so forth. In certain environments, not all but some of these 128 bit combinations (with forbidden_zero_bit equal to 1) may be reserved to prevent certain start code emulations. For example, in order to prevent what is known as "Annex B" start code emulation, only the value 0 for the first octet of the NAL unit header needs to be avoided. In order to prevent start code emulation of the MPEG-2 Packetized Elementary Stream ("PES-") channels, only values between 188 and 255 need to be avoided. Other system standards can have different, but conceptually comparable constraints. Keeping those constraints in mind when populating allowable values for NAL Unit Class and TID-Type, the forbidden zero bit can be used as a demultiplexing point even when start code emulation is required.

In the same or another embodiment, a given NAL Unit Class value may be used as an indication of the presence of one or more additional octets in the NAL unit header. Such additional octets may be used to further extent the coding options for less commonly used NAL units.

Figure 7:
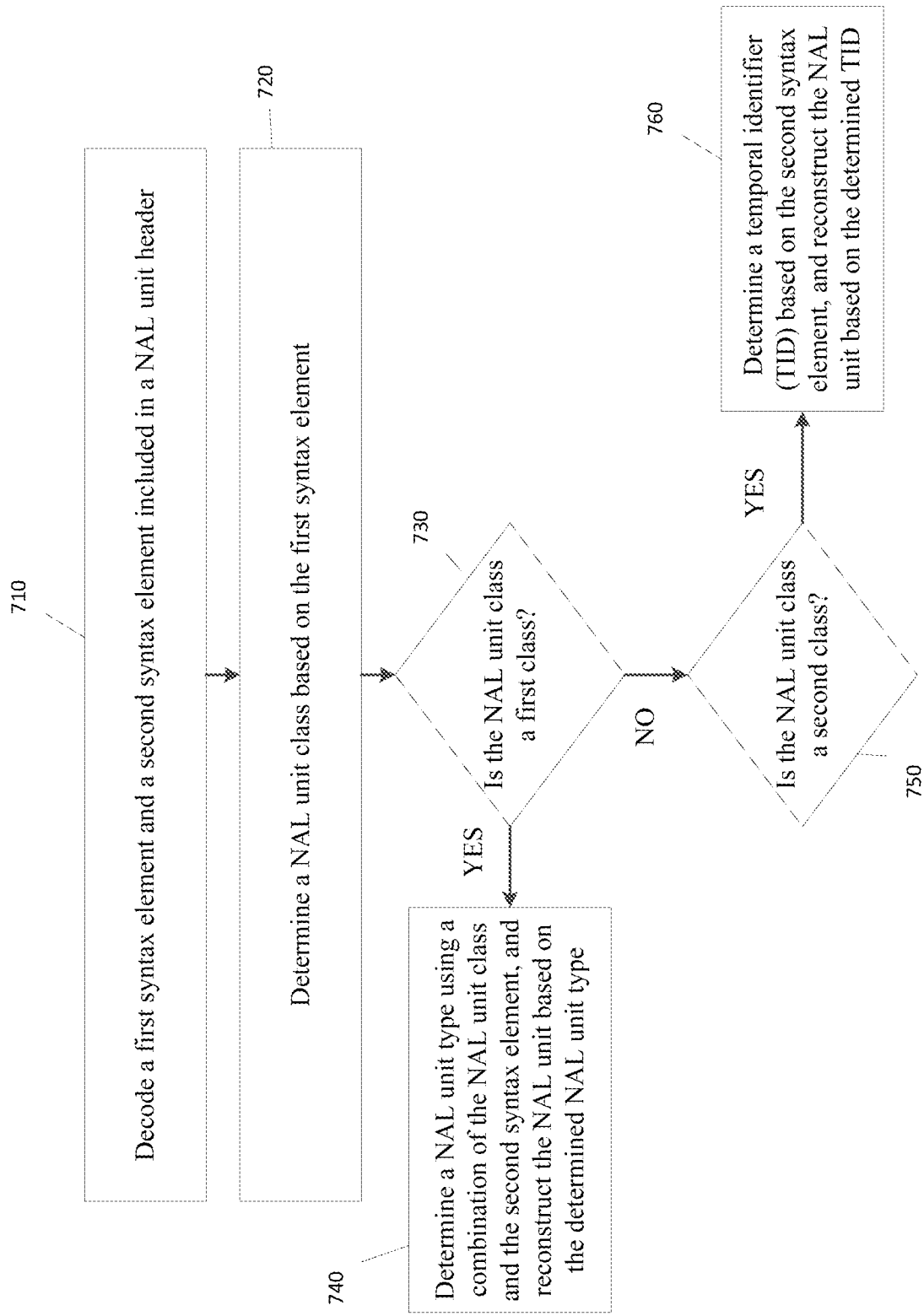
FIG. 7 is a flowchart of an example process for reconstructing a Network Abstraction Layer (NAL) unit for video decoding according to an embodiment

FIG. 7 is a flowchart is a flowchart of an example process 700 for generating a merge candidate list using middle candidates. In some implementations, one or more process blocks of FIG. 7 may be performed by decoder 310. In some implementations, one or more process blocks of FIG. 7 may be performed by another device or a group of devices separate from or including decoder 310, such as encoder 303.

As shown in FIG. 7, process 700 may include decoding a first syntax element and a second syntax element included in a NAL unit header (block 710).

As further shown in FIG. 7, process 700 may include determining, based on the first syntax element, a NAL unit class including a plurality of NAL unit types (block 720).

As further shown in FIG. 7, process 700 may include determining whether the NAL unit class is a first NAL unit class (block 730). If the NAL unit class is the first NAL unit class, process 700 may proceed to block 740. If the NAL unit class is not the first NAL unit class, process 700 may proceed to block 750.

As further shown in FIG. 7, process 700 may include, based on the NAL unit class being a first NAL unit class, determining a NAL unit type from among the NAL unit types using a combination of the NAL unit class and the second syntax element, and reconstructing the NAL unit based on the determined NAL unit type (block 750).

As further shown in FIG. 7, process 700 may include determining whether the NAL unit class is a second NAL unit class (block 750). If the NAL unit class is the first NAL unit class, process 700 may proceed to block 760.

As further shown in FIG. 7, process 700 may include, based on the NAL unit class being a second NAL unit class, determining a temporal identifier (TID) based on the second syntax element, and reconstructing the NAL unit based on the determined TID (block 760).

In an embodiment, based on the NAL unit class being the first NAL unit class, the TID is determined to be zero.

In an embodiment, the first NAL unit class may indicate that a parameter set corresponding to the NAL unit relates to a plurality of temporal layers.

In an embodiment, the parameter set may include at least one from among a decoder parameter set, a video parameter set, and a sequence parameter set.

In an embodiment, the first NAL unit class may indicate that a parameter set corresponding to the NAL unit relates to a single coded picture.

In an embodiment, the parameter set may include at least one from among a picture parameter set, a slice parameter set, an adaptation parameter set, and a header parameter set.

In an embodiment, the first NAL unit class may indicate that the NAL unit relates to non-normative data.

In an embodiment, the non-normative data may include supplementary enhancement information, filler data, and picture delimiter data.

In an embodiment, the first syntax element may include a first fixed length, binary-coded NAL unit syntax element, and the second syntax element may include a second fixed length, binary-coded NAL unit syntax element.

In an embodiment, the first syntax element may include a forbidden zero bit.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above for network abstraction unit header, can be implemented as computer software using computer-readable instructions and physically stored in one or more computer-readable media. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. ~8 for computer system ~800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system ~800.

Computer system ~800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard ~801, mouse ~802, trackpad ~803, touch screen ~810, data-glove 1204, joystick ~805, microphone ~806, scanner ~807, camera ~808.

Computer system ~800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen ~810, data-glove 1204, or joystick ~805, but there can also be tactile feedback devices that do not serve as input devices), audio output devices (such as: speakers ~809, headphones (not depicted)), visual output devices (such as screens ~810 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system ~800 can also include human accessible storage devices and their associated media such as optical media including CD/DVD ROM/RW ~820 with CD/DVD or the like media ~821, thumb-drive ~822, removable hard drive or solid state drive ~823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system ~800 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (~849) (such as, for example universal serial bus (USB) ports of the computer system ~800; others are commonly integrated into the core of the computer system ~800 by attachment to a system bus as described below (for example Ethernet interface into a PC computer system or cellular network interface into a smartphone computer system). As an example, network ~855 may be connected to peripheral bus ~849 using network interface ~854. Using any of these networks, computer system ~800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core ~840 of the computer system ~800.

The core ~840 can include one or more Central Processing Units (CPU) ~841, Graphics Processing Units (GPU) ~842, specialized programmable processing units in the form of Field Programmable Gate Areas (FPGA) ~843, hardware accelerators for certain tasks ~844, and so forth. These devices, along with Read-only memory (ROM) ~845, Random-access memory (RAM) ~846, internal mass storage such as internal non-user accessible hard drives, solid-state drives (SSDs), and the like ~847, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus ~849. Architectures for a peripheral bus include peripheral component interconnect (PCI), USB, and the like.

CPUs ~841, GPUs ~842, FPGAs ~843, and accelerators ~844 can execute certain instructions that, in combination, can make up the aforementioned computer code. That computer code can be stored in ROM ~845 or RAM ~846. Transitional data can be also be stored in RAM ~846, whereas permanent data can be stored for example, in the internal mass storage ~847. Fast storage and retrieve to any of the memory devices can be enabled through the use of cache memory, that can be closely associated with one or more CPU ~841, GPU ~842, mass storage ~847, ROM ~845, RAM ~846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture ~800, and specifically the core ~840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core ~840 that are of non-transitory nature, such as core-internal mass storage ~847 or ROM ~845. The software implementing various embodiments of the present disclosure can be stored in such devices and executed by core ~840. A computer-readable medium can include one or more memory devices or chips, according to particular needs. The software can cause the core ~840 and specifically the processors therein (including CPU, GPU, FPGA, and the like) to execute particular processes or particular parts of particular processes described herein, including defining data structures stored in RAM ~846 and modifying such data structures according to the processes defined by the software. In addition or as an alternative, the computer system can provide functionality as a result of logic hardwired or otherwise embodied in a circuit (for example: accelerator ~844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of reconstructing a Network Abstraction Layer (NAL) unit for video decoding using at least one processor, the method comprising:

decoding a first syntax element having a first fixed length, the first syntax element being a binary-coded NAL unit syntax element included in a NAL unit header;

determining, based on the first syntax element, a NAL unit class comprising one or more NAL unit types, the NAL unit class being among a plurality of NAL unit classes each associated with separate set of NAL unit types;

decoding a second syntax element having a second fixed length, the second syntax element being a binary-coded NAL unit syntax element included in the NAL unit header and being different from the first syntax element; and based on the NAL unit class being a first NAL unit class, determining a NAL unit type from among the one or more NAL unit types using a combination of the NAL unit class and the second syntax element, wherein the second syntax element being configured for indexing within a set of NAL unit types belonging to the first NAL unit class;

based on the NAL unit class bieng a second NAL unit class, determining the NAL unit type solely from the first syntax element and using information extracted from the second syntax element as a temporal identifier (TID); and reconstructing the NAL unit based on at least the determined NAL unit type.

2. The method of claim 1, wherein based on the NAL unit class being the first NAL unit class, a temporal identifier (TID) is determined to be zero.

3. The method of claim 1, wherein the first NAL unit class indicates that a parameter set corresponding to the NAL unit relates to a plurality of temporal layers.

4. The method of claim 3, wherein the parameter set comprises at least one from among a decoder parameter set, a video parameter set, and a sequence parameter set.

5. The method of claim 1, wherein the first NAL unit class indicates that a parameter set corresponding to the NAL unit relates to a single coded picture.

6. The method of claim 5, wherein the parameter set comprises at least one from among a picture parameter set, a slice parameter set, an adaptation parameter set, and a header parameter set.

7. The method of claim 1, wherein the first NAL unit class indicates that the NAL unit relates to non-normative data.

8. The method of claim 7, wherein the non-normative data comprises supplementary enhancement information, filler data, and picture delimiter data.

9. A device for reconstructing a Network Abstraction Layer (NAL) unit for video decoding, the device comprising:

at least one memory configured to store program code; and at least one processor configured to read the program code and operate as instructed by the program code, the program code including:

first decoding code configured to cause the at least one processor to decode a first syntax element having a first fixed length, the first syntax element being a binary-coded NAL unit syntax element included in a NAL unit header;

first determining code configured to cause the at least one processor to, based on the first syntax element, determine a NAL unit class comprising one or more NAL unit types, the NAL unit class being among a plurality of NAL unit classes each associated with separate sets of NAL unit types;

second decoding code configured to cause the at least one processor to decode a second syntax element having a second fixed length, the second syntax element being a binary-coded NAL unit syntax element included in the NAL unit header and being different from the first syntax element; and second determining code configured to cause the at least one processor to:

based on the NAL unit class being a first NAL unit class, determine a NAL unit type from among the one or more NAL unit types using a combination of the NAL unit class and the second syntax element, wherein the second syntax element being configured for indexing within a set of NAL unit types belonging to the first NAL unit class;

based on the NAL unit class being a second NAL unit class, determine the NAL unit type solely from the first syntax element and using information extracted from the second syntax element as a temporal identified (TID); and reconstruct the NAL unit based on at least the determined NAL unit type.

10. The device of claim 9, wherein based on the NAL unit class being the first NAL unit class, a temporal identifier (TID) is determined to be zero.

11. The device of claim 9, wherein the first NAL unit class indicates that a parameter set corresponding to the NAL unit relates to a plurality of temporal layers.

12. The device of claim 11, wherein the parameter set comprises at least one from among a decoder parameter set, a video parameter set, and a sequence parameter set.

13. The device of claim 9, wherein the first NAL unit class indicates that a parameter set corresponding to the NAL unit relates to a single coded picture.

14. The device of claim 13, wherein the parameter set comprises at least one from among a picture parameter set, a slice parameter set, an adaptation parameter set, and a header parameter set.

15. The device of claim 9, wherein the first NAL unit class indicates that the NAL unit relates to non-normative data.

16. A non-transitory computer-readable medium storing instructions, the instructions comprising: one or more instructions that, when executed by one or more processors of a device for reconstructing a Network Abstraction Layer (NAL) unit for video decoding, cause the one or more processors to:

decode a first syntax element included in a NAL unit header;

determine, based on the first syntax element, a NAL unit class comprising one or more NAL unit types, the NAL unit class being among a plurality of NAL unit classes each associated with separate sets of NAL unit types;

decode a second syntax element included in the NAL unit header, the second syntax element being different from the first syntax element; and based on the NAL unit class being a first NAL unit class, determine a NAL unit type from among the one or more NAL unit types using a combination of the NAL unit class and the second syntax element, wherein the second syntax element being configured for indexing within a set of NAL unit types belonging to the first NAL unit class;

based on the NAL unit class being a second NAL unit class, determine the NAL unit type solely from the first syntax element and using information extracted from the second syntax element as a temporal identifier (TID); and reconstruct the NAL unit based on at least the determined NAL unit type.

17. The non-transitory computer-readable medium of claim 16, wherein based on the NAL unit class being the first NAL unit class, a temporal identifier (TID) is determined to be zero.

18. The non-transitory computer-readable medium of claim 16, wherein the first NAL unit class indicates that a parameter set corresponding to the NAL unit relates to a plurality of temporal layers.

19. The non-transitory computer-readable medium of claim 18, wherein the parameter set comprises at least one from among a decoder parameter set, a video parameter set, and a sequence parameter set.

20. The non-transitory computer-readable medium of claim 16, wherein the first NAL unit class indicates that a parameter set corresponding to the NAL unit relates to a single coded picture.

* * * * *

UNITED STATES PATENT AND TRADEMARK OFFICE
CERTIFICATE OF CORRECTION

| | |
|---|---|
| PATENT NO. | : 11,882,312 B2 |
| APPLICATION NO. | : 17/837776 |
| DATED | : January 23, 2024 |
| INVENTOR(S) | : Stephan Wenger, Byeongdoo Choi and Shan Liu |

It is certified that error appears in the above-identified patent and that said Letters Patent is hereby corrected as shown below:

In the Claims

In Column 20, Claim 1, Line 55, delete "set" and replace with --sets--.

In Column 21, Claim 1, Line 1, delete "bieng" and replace with --being--.

In Column 21, Claim 9, Line 67, delete "identified" and replace with --identifier--.

Signed and Sealed this
Twenty-sixth Day of March, 2024

Katherine Kelly Vidal
*Director of the United States Patent and Trademark Office*